(12) United States Patent
Wang et al.

(10) Patent No.: US 8,106,119 B2
(45) Date of Patent: Jan. 31, 2012

(54) THERMALLY CONDUCTIVE SILICONE COMPOSITION

(76) Inventors: Sea-Fue Wang, Taipei (TW);
Chun-Ting Yeh, Taipei (TW);
Yuh-Ruey Wang, Taipei (TW);
Hsi-Chuan Lu, Taipei (TW)

( * ) Notice: Subject to any disclaimer, the term of this patent is extended or adjusted under 35 U.S.C. 154(b) by 35 days.

(21) Appl. No.: 12/754,598

(22) Filed: Apr. 5, 2010

(65) Prior Publication Data

US 2010/0243949 A1    Sep. 30, 2010

Related U.S. Application Data

(63) Continuation-in-part of application No. 11/949,821, filed on Dec. 4, 2007, now abandoned.

(51) Int. Cl.
C08K 3/22    (2006.01)
C08K 3/14    (2006.01)
C08K 3/28    (2006.01)

(52) U.S. Cl. ........ 524/430; 524/424; 524/428; 524/431; 524/432; 524/433; 524/497

(58) Field of Classification Search .................. 524/424, 524/428, 430, 431, 432, 433, 497
See application file for complete search history.

(56) References Cited

U.S. PATENT DOCUMENTS

| | | |
|---|---|---|
| 5,981,641 A | 11/1999 | Takahashi et al. |
| 6,114,429 A | 9/2000 | Yamada et al. |
| 6,162,849 A | 12/2000 | Zhuo et al. |
| 6,174,841 B1 | 1/2001 | Yamada et al. |
| 6,255,257 B1 | 7/2001 | Yamada et al. |
| 6,372,337 B2 | 4/2002 | Takahashi et al. |
| 6,649,258 B2 | 11/2003 | Yamada et al. |
| 6,828,369 B2 | 12/2004 | Takahashi et al. |
| 2003/0207128 A1* | 11/2003 | Uchiya et al. ................. 428/447 |

* cited by examiner

*Primary Examiner* — Peter Szekely
(74) *Attorney, Agent, or Firm* — Chun-Ming Shih

(57) ABSTRACT

A thermally conductive silicone composition includes 25 to 50 volume % of a silicone, 30 to 60 volume % of a first heat conducting filler, and 20 to 40 volume % of a second heat conducting filler, and 1 to 2 volume % of a third heat conducting filler. The thermally conductive silicone composition has two heat conducting fillers with different sizes dispersed therein, thus the thermal impedance can be efficiently reduced.

15 Claims, 2 Drawing Sheets

THERMALLY CONDUCTIVE SILICONE COMPOSITION

CROSS REFERENCES RELATED TO THE APPLICATION

This application is a continuation-in-part of U.S. patent application Ser. No. 11/949,821, filed on Dec. 4, 2007 now abandoned.

BACKGROUND

1. Field of the Invention

This invention relates to thermally conductive materials, more particularly to a thermally conductive silicone composition.

2. Description of Related Art

Recently, removing heat from heat generating electronic appliances comes to be more and more important. Electronic appliances such as electronic instruments, computers, or mobile phones generate heat when they are used. The heat generated from the electronic appliances will affect their normal operation. Generally, heat dissipating sheets are applied in electronic appliances, for example, by being interposed between a heat generating electronic component and a radiator. The heat dissipating sheet which conducts heat from the electronic component to the radiator must have high thermal conductivity in order to efficiently cool the electronic appliances as described above. However, a clearance inevitably exists between the heat dissipating sheet and the electronic component. As such, a thermal impedance can be formed between the electronic component and the heat dissipating sheet, thereby greatly reduces the thermally conductive efficiency of the heat dissipating sheet. In order to reduce the thermal impedance between the electronic component and the heat dissipating sheet, thermally conductive silicone compositions are applied in the heat dissipating sheet. Thermally conductive silicone compositions can be used to fill the clearance between the heat dissipating sheet and the electronic component, thereby reducing the thermal impedance. Conventional thermally conductive silicone compositions have low heat conductivities (e.g., in a range from 0.1 W/mK to 0.3 W/mK). Therefore, heat conducting fillers are applied to thermally conductive silicone compositions to improving their heat conductivities. Presently, as heat dissipating manners, thermally conductive silicone compositions can be made into heat dissipating sheets as set forth above, heat dissipating greases or phase change materials to meet various requirements.

A thermally conductive composition is disclosed in U.S. Pat. No. 5,981,641. The thermally conductive composition includes a liquid silicone base, an aluminum nitride (AlN) filler and a zinc oxide (ZnO) filler dispersed into the liquid silicone base. A particle diameter of the aluminum nitride is equal to that of the zinc oxide, and is in a range from 0.1 micrometers to 5 micrometers. A content of the zinc oxide in the sum of the aluminum nitride and the zinc oxide is in a range from 0.05% to 0.5% by weight. A content of the sum of the aluminum nitride and the zinc oxide in the thermally conductive composition is in a range from 83% to 91% by weight. A heat conductivity of the thermally conductive composition is in a range from 2.5 W/mK to 3.7 W/mK. In this thermally conductive composition, zinc oxide can improve a lubricative property of the particles of the aluminum nitride.

U.S. Pat. Nos. 6,114,429 and 6,162,849 disclose a thermally conductive composition. In the conductive composition, a mixture of two types of liquid state silicon emulsion is used as a base, and three types of fillers are dispersed into the base. The three types of fillers respectively are aluminum oxide particles with a particle diameter of 40 micrometers to 80 micrometers, aluminum nitride particles with a particle diameter of 0.5 micrometers to 5 micrometers, boron nitride particles with a particle diameter of 1 micrometer to 10 micrometers, and silicon carbide particles with a particle diameter of 0.4 micrometers to 10 micrometers or zinc oxide particles with a particle diameter of 0.2 micrometers to 5 micrometers. Three types of above fillers with fine and coarse particles are mixed into the base to form a desired thermally conductive composition. A content of the sum of the three types of fillers in the thermally conductive composition is in a range from 50% to 90% by weight. A heat conductivity of the thermally conductive composition is in a range from 1.2 W/mK to 2.9 W/mK.

U.S. Pat. Nos. 6,174,841 and 6,255,257 disclose a thermally conductive composition. In the thermally conductive composition, two or more fillers with different diameters are dispersed into various silicone bases with different viscosity. The thermally conductive composition includes a main filler and a minor filler. The main filler is aluminum nitride. The minor filler is selected from a group consisting of aluminum oxide, boron nitride, silicon carbide and zinc oxide. A content of the main filler in the thermally conductive composition is in a range from 50% to 95% by weight. An average diameter of the particles of the main filler is in a range from 0.5 micrometers to 25 micrometers. A content of the minor filler in the thermally conductive composition is in a range from 0% to 50% by weight. These minor fillers can enable the filler dispersed in the silicone base having a highest density, thereby improving a heat conductivity of the thermally conductive composition. The heat conductivity of the thermally conductive composition is in a range from 1 W/mK to 3.5 W/mK.

U.S. Pat. No. 6,372,337 discloses a thermally conductive composition including fillers and a silicone base penetrating into clearances among the particles of the fillers. The silicone base is formed by mixing five or more liquid state silicones. The fillers include a main filler and a minor filler. The main filler can be aluminum particles, and an average diameter thereof is in a range from 0.5 micrometers to 50 micrometers. The minor filler can be boron nitride particles or zinc oxide particles. An average diameter of the boron nitride particles is in a range from 1 micrometer to 5 micrometers. An average diameter of the zinc oxide particles is in a range from 0.2 micrometers to 5 micrometers. A content of the sum of the main filler and the minor filler in the thermally conductive composition is in a range from 50% to 90% by weight. A heat conductivity of the thermally conductive composition is in a range from 3.3 W/mK to 4.2 W/mK.

U.S. Pat. No. 6,649,258 discloses a thermally conductive composition including fillers and a silicone base penetrating into clearances among the particles of the fillers. The silicone base is formed by mixing four or more liquid state silicones. The fillers include a main filler and a minor filler. The main filler can be aluminum particles, and an average diameter thereof is in a range from 0.1 micrometers to 50 micrometers. The minor filler can be zinc oxide particles. A ratio of the aluminum particles to the zinc oxide particles is in a range from 1/1 to 10/1. A content of the sum of the aluminum particles to the zinc oxide particles in the thermally conductive composition is in a range from 80% to 92% by weight. A heat conductivity of the thermally conductive composition is in a range from 1.7 W/mK to 3.8 W/mK.

U.S. Pat. No. 6,828,369 discloses a thermally conductive composition including an organic polymer, and spherical or non-spherical aluminum oxide particles dispersed into the organic polymer. As a heat conducting filler, the spherical or non-spherical aluminum oxide particles are sufficiently dispersed into the organic polymer. When a content of the heat conducting filler in the thermally conductive composition is higher than 70% by volume, a heat conductivity of the thermally conductive composition is larger than 5.5 W/mK.

However, regarding the above-described patents, a manufacturing cost of the main fillers is relatively high. In addition, the proportion and diameter of the main fillers render the thermally conductive composition having a low mechanical strength, low surface evenness or high surface roughness. As such, the thermally conductive silicone composition is difficult to be compressed, and a thermal impedance between the heat generating appliances and the thermally conductive silicone composition is relatively high.

Therefore, a thermally conductive silicone composition having low manufacturing cost, high mechanical strength, low thermal impedance, and is easily to be compressed is desired.

BRIEF SUMMARY

The present invention provides a thermally conductive silicone composition. The thermally conductive silicone composition is manufactured by adding three types of fillers with various ratios and different diameters into a silicone. Being manufactured by such method, the thermally conductive silicone composition has a low manufacturing cost, high mechanical strength, low thermal impedance, and is easily to be compressed. An embodiment of the thermally conductive silicone composition includes 25 to 50 volume % of a silicone, 30 to 60 volume % of a first heat conducting filler, and 15 to 40 volume % of a second heat conducting filler, and 1 to 2 volume % of a third heat conducting filler. That is to say, a proportion of the silicone to the thermally conductive silicone composition to be prepared is from about 25% to about 50% by volume. A proportion of the first heat conducting filler to the thermally conductive silicone composition is from about 30% to about 60% by volume. A proportion of the second heat conducting filler to the thermally conductive silicone composition is from about 15% to about 40% by volume. A proportion of the third heat conducting filler to the thermally conductive silicone composition is from about 1% to about 2% by volume. A proportion of the sum of the first heat conducting filler and the second heat conducting filler and the third heat conducting filler to the thermally conductive silicone composition is from about 50% to about 75% by volume.

The silicone can be high-temperature vulcanized silicone, or low-temperature vulcanized silicone. The silicone can be silicone rubber or silicone colloid. The silicone rubber has an excellent machanicality and high heat resistance. In addition, a physical feature of the silicone rubber can not be affected by temperature changes. Except having the above advantageous of the silicone rubber, the silicone colloid has excellent performance in adhesion, excellent fluidity, and low load. The silicone colloid is very soft, and can be obtained by curing a liquid silicone with low viscosity index.

The first heat conducting filler, the second heat conducting filler and the third heat conducting filler are mixed into the silicone. A proportion of the sum of the first heat conducting filler and the second heat conducting filler and the third heat conducting filler to the thermally conductive silicone composition is from about 50% to about 75% by volume. The first heat conducting filler may be comprised of particles with uniform or non-uniform size. When the first heat conducting filler is comprised of particles with uniform size, a diameter of the particle is in a range from about 15 micrometers to about 50 micrometers. When the first heat conducting filler is comprised of particles with non-uniform size, an average diameter of the particle is in a range from about 15 micrometers to about 50 micrometers. The first heat conducting filler can be selected from a group consisting of copper oxide, magnesium oxide, iron oxide, titanium oxide, silicon carbide and iron carbide. The second heat conducting filler may be comprised of particles with uniform or non-uniform size. When the second heat conducting filler is comprised of particles with uniform size, a diameter of the particle is in a range from about 1 micrometer to about 10 micrometers. When the second heat conducting filler is comprised of particles with non-uniform size, an average diameter of the particle is in a range from about 1 micrometer to about 10 micrometers. The second heat conducting filler can be selected from a group consisting of zinc oxide, magnesium oxide, titanium nitride, silicon carbide, iron carbide, iron oxide and copper oxide. When the third heat conducting filler is comprised of particles with nano size, a diameter of the particle is in a range from about 100 nanometer to about 200 nanometer. When the third heat conducting filler is comprised of particles with non-uniform size and uniform size, an average diameter of the particle is in a range from about 100 nanometer to about 200 nanometers. The third heat conducting filler can be selected from a group consisting of zinc oxide.

The thermally conductive silicone composition has a low manufacturing cost for employing the cheap first and second heat conducting fillers. In addition, The above first, second and third heat conducting fillers can be semi-conductors or insulators, therefore, the thermally conductive silicone composition containing these heat conducting fillers has an excellent electrical insulation. In detail, the silicon carbide and iron carbide are semi-conductors, and the copper oxide, magnesium oxide, iron oxide, zinc oxide, boron nitride are insulators. Because of containing these semi-conductors and/or insulators, the thermally conductive silicone composition can be safely arranged between the electronic component and the heat dissipating device. Furthermore, the first and second heat conducting fillers can be modified by silicon tetrachloride. Therefore, surfaces of the thermally conductive silicone composition containing the first, second and third heat conducting fillers can be modified by the silicon tetrachloride. As a result, the thermally conductive silicone composition can achieve a low surface roughness (i.e., a high surface evenness). As such, the thermally conductive silicone composition can be tightly combined with the electronic component and/or the heat dissipating device. Thus, the heat generated from the electronic component can be removed efficiently and timely.

The thermally conductive silicone composition has three heat conducting fillers with different sizes dispersed therein. The first heat conducting filler and the second heat conducting filler are cooperate to fill interstices formed by molecules of the silicone, thereby improving the heat conductivity of the thermally conductive silicone composition. Referring to FIG. 1, a thermally conductive silicone composition includes a silicone 1 and a first heat conducting filler 2 dispersed therein. A number of interstices 3 are inevitably formed among molecules of silicone 1 or among particles of the first heat conducting filler 2. Thus, the silicone 1 can be easily separated. In addition, the presence of the interstices 3 can form a thermal impedance, thereby reducing the heat conductivity of the thermally conductive silicone composition. Referring to FIG. 2, a thermally conductive silicone composition includes a silicone 1, a first heat conducting filler 2 and a second heat conducting filler 4 and a third heat conducting filler 5. A particle diameter of the second heat conducting filler 4 is less than that of the first heat conducting filler 2. Thus, the particles of the second heat conducting filler 4 and the third heat conducting filler 5 can disperse/fill into interstices 3 formed among molecules of silicone 1 or particles of the first heat conducting filler 2. Therefore, the combination of the first, second and third heat conducting fillers 2, 4 and 5 can efficiently reduce the thermal impedance, thereby improving the heat conductivity of the thermally conductive silicone composition.

On the one hand, when a ratio of the second heat conducting filler with small diameter is less than 20% by volume, because the interstices among the particles of the first heat conducting filler can not be filled, thus the heat conductivity of the thermally conductive silicone composition may be reduced. On the other hand, when a ratio of the second heat conducting filler with small diameter is larger than 40% by volume, a quantity of the second heat conducting filler may be larger than a desired quantity of the second heat conducting filler for filling the interstices formed among the first heat conducting filler, thus the heat conductivity of the thermally conductive silicone composition may also be reduced. Therefore, a ratio of the second heat conducting filler with small diameter to the thermally conductive silicone composition is, advantageously, in a range from 20% to 40% by volume.

The present invention additionally provides a heat dissipating sheet. The heat dissipating sheet is manufactured by curing the thermally conductive silicone composition with an appropriate hardener added therein.

The heat dissipating sheet can be a room-temperature heat dissipating sheet or a high-temperature heat dissipating sheet. The room-temperature heat dissipating sheet can be made by solidifying a mixture of the liquid thermally conductive silicone composition and a certain hardener at room temperature. Similarly, the high-temperature heat dissipating sheet can be made by solidifying a mixture of the liquid thermally conductive silicone composition and a certain hardener at a high temperature, e.g. at 175 degrees Celsius. A typical process for making heat dissipating sheet includes following steps. First, the silicone, the first heat conducting filler and the second heat conducting filler have been mixed and blended to form an uniform mixture. Second, the mixture can be molded using pressing, coating or laminating method. The process for manufacturing thermally conductive silicone composition can be freely selected according to the corresponding characteristic of the desired thermally conductive silicone composition.

Advantageously, a thickness of the heat dissipating sheet is in a range from about 0.1 millimeters to about 5 millimeters. When the thickness of the heat dissipating sheet is less than 0.5 millimeters, the heat dissipating sheet may have a low manufacturing efficiency. When the thickness of the heat dissipating sheet is larger than 5 millimeters, the thermal impedance the manufacturing cost may be inevitably increased.

Advantageous and novel features will become more apparent from the following detailed description when taken in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
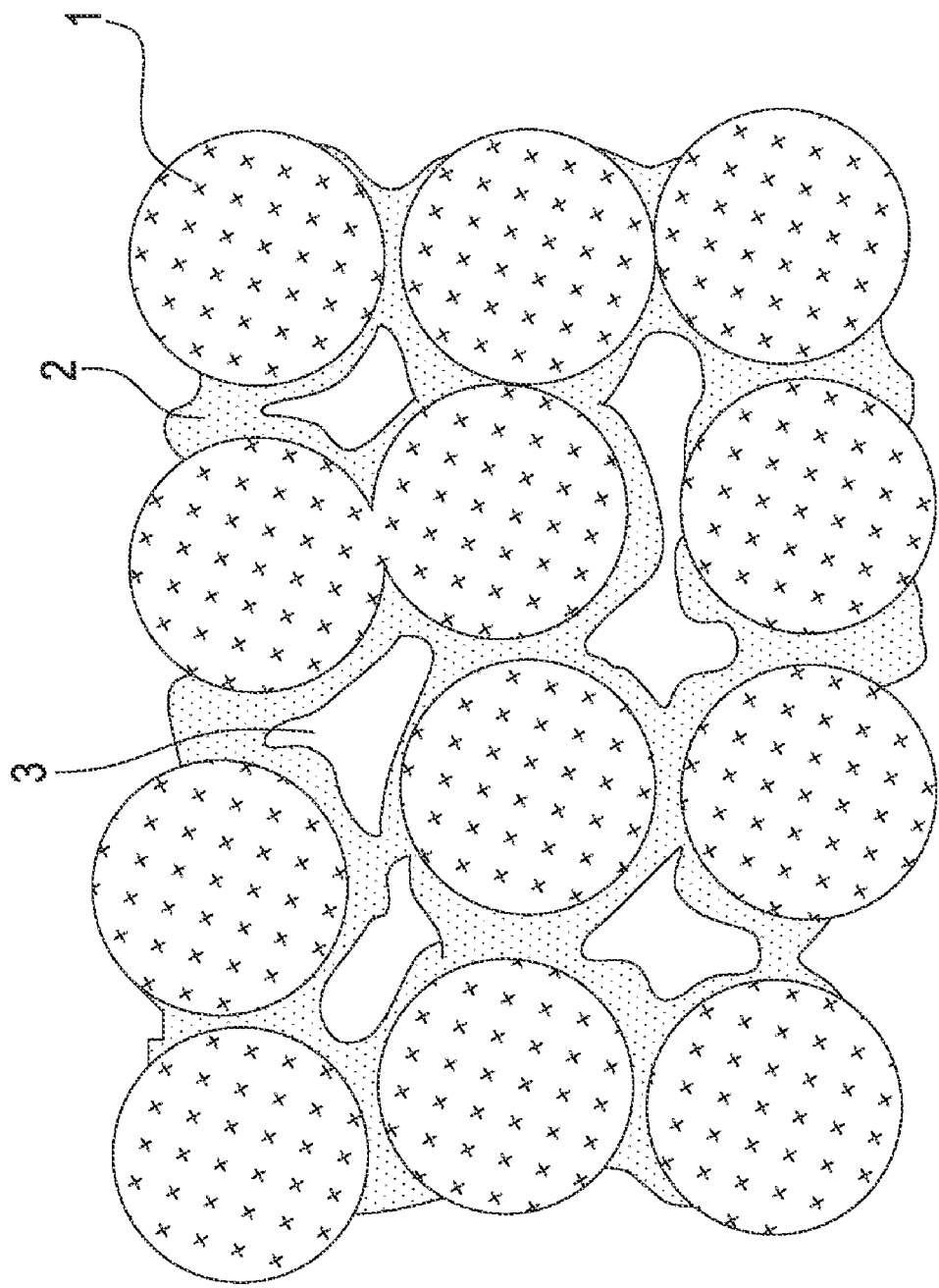
FIG. 1 is a schematic view of a thermally conductive silicone composition having a first heat conducting filler alone dispersed therein.
Figure 2:
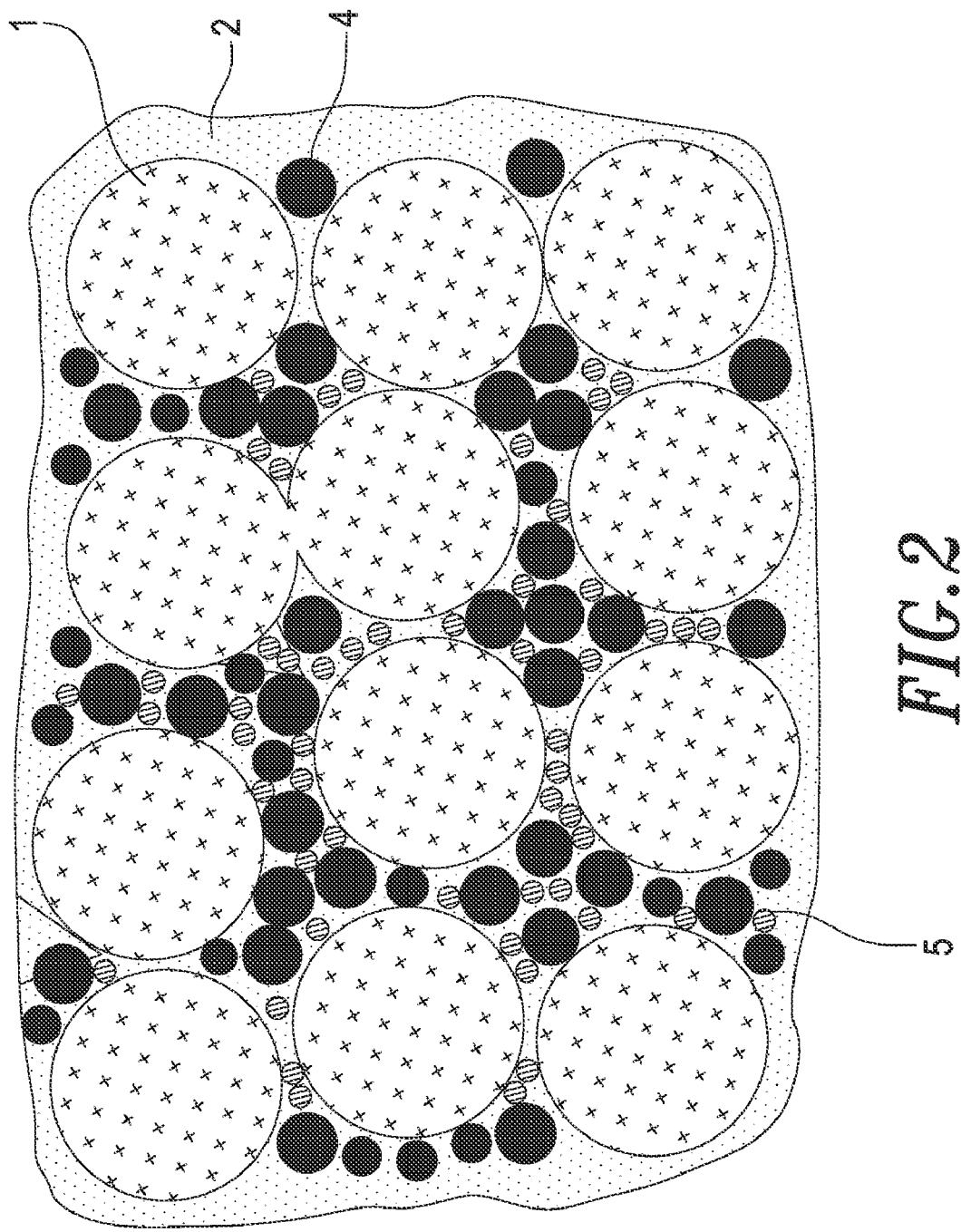
FIG. 2 is a schematic view of a thermally conductive silicone composition having a first heat conducting filler and a second heat conducting filler dispersed therein.

Embodiments will now be described below in detail. In the following Examples and Comparative Examples, the thermal conductivity of each thermally conductive silicone composition is measured at an identical circumstance (i.e. temperature: 23±1 degrees Celsius, humidity: 50%±10%), with a thermal conductivity meter (made by Hot Disk AB, Sweden), by the Center of EMO Materials and Nanotechnology, National Taipei University of Technology, Taiwan. The Center is a certificated laboratory by Taiwan Accreditation Foundation.

EXAMPLES 1 TO 8

A liquid room-temperature vulcanized silicone having a specific gravity of 0.98 and a consistency of 100 (trade name is SC412, made by Hsin Han Electronic Co. Ltd., Taiwan) is used as the silicone. In the Examples 1 to 8, a proportion of such silicone to the thermally conductive silicone composite to be prepared is 40% by volume. Silicon carbide (SiC) particles having an average diameter of 18 millimeters (MODEL GC8000, manufactured by Titanex Corp., Taiwan) is used as the first heat conducting filler. Zinc oxide (ZnO) particles having an average diameter of 1 millimeter to 5 millimeters (manufactured by Pan-Continental Chemical Co., Ltd., Taiwan) is used as the second heat conducting filler. At room temperature, the mixture of the silicone, the first and second heat conducting fillers is blended well to form a thermally conductive silicone composition. In such fashion, eight thermally conductive silicone compositions can be prepared. The thermal conductivity of each of the thermally conductive silicone compositions is measured. The proportion of the first and second heat conducting fillers, and the thermal conductivity of each of the thermally conductive silicone compositions to be prepared are shown in Table 1.

TABLE 1

| Examples | SiC (18 µm) | ZnO (1~5 µm) | Cross-Link | Thermal conductivity (W/m · K) |
|---|---|---|---|---|
| 1 | 55 vol % | 5 vol % | — | X |
| 2 | 50 vol % | 10 vol % | — | 2.4 |
| 3 | 45 vol % | 15 vol % | — | 2.6 |
| 4 | 40 vol % | 20 vol % | — | 2.4 |
| 5 | 35 vol % | 25 vol % | — | 2.5 |
| 6 | 30 vol % | 30 vol % | — | 2.4 |
| 7 | 20 vol % | 40 vol % | — | 2.1 |
| 8 | 10 vol % | 50 vol % | — | 1.6 |

According to the data shown in Table 1, the thermally conductive silicone compositions prepared in Examples 1 to 8 have their thermal conductivity in a range from 1.6 W/Mk to 2.4 W/Mk.

EXAMPLES 9 TO 13

The silicone and the first heat conducting filler of Examples 9 to 13 are similar to those of Examples 1 to 8, except that the second heat conducting filler and the proportion of the first and second heat conducting fillers. Copper oxide (CuO) particles having an average diameter of 5 millimeters (manufactured by Echo Chemical Co., Ltd., Taiwan)

is used as the second heat conducting filler. The proportion of the first and second heat conducting fillers to the corresponding thermally conductive silicone composition to be prepared, and the thermal conductivity of each of the thermally conductive silicone compositions to be prepared are shown in Table 2.

TABLE 2

| Examples | SiC (18 μm) | CuO (5 μm) | Cross-Link | Thermal conductivity (W/m · K) |
|---|---|---|---|---|
| 9 | 50 vol % | 10 vol % | — | 1.9 |
| 10 | 40 vol % | 20 vol % | — | 1.9 |
| 11 | 30 vol % | 30 vol % | — | 2.0 |
| 12 | 20 vol % | 40 vol % | — | 1.7 |
| 13 | 10 vol % | 50 vol % | — | 1.5 |

As can be seen from the data shown in Table 2, the thermally conductive silicone compositions prepared in Examples 9 to 13 have their thermal conductivity in a range from 1.5 W/Mk to 2.0 W/Mk.

EXAMPLES 14 TO 18

The silicone and the first heat conducting filler of Examples 14 to 18 are similar to those of Examples 1 to 8, except that the second heat conducting filler and the proportion of the first and second heat conducting fillers. Iron oxide ($Fe_2O_3$) particles having an average diameter of 1 millimeter (manufactured by Echo Chemical Co., Ltd., Taiwan) is used as the second heat conducting filler. The proportion of the first and second heat conducting fillers to the corresponding thermally conductive silicone composition to be prepared, and the thermal conductivity of each of the thermally conductive silicone compositions to be prepared are shown in Table 3.

TABLE 3

| Examples | SiC(18 μm) | $Fe_2O_3$ (1 μm) | Cross-Link | Thermal conductivity (W/m · K) |
|---|---|---|---|---|
| 14 | 50 vol % | 10 vol % | — | 2.4 |
| 15 | 40 vol % | 20 vol % | — | 2.4 |
| 16 | 30 vol % | 30 vol % | — | 2.4 |
| 17 | 20 vol % | 40 vol % | — | 2.2 |
| 18 | 10 vol % | 50 vol % | — | X |

As can be seen from the data shown in Table 3, the thermally conductive silicone composition prepared in Examples 14 to 18 have their thermal conductivity in a range from 2.2 W/Mk to 2.4 W/Mk.

EXAMPLES 19 TO 23

The silicone and the first heat conducting filler of Examples 19 to 23 are similar to those of Examples 1 to 8, except that the second heat conducting filler and the proportion of the first and second heat conducting fillers. Aluminum oxide ($Al_2O_3$) particles having an average diameter of 1 millimeter (manufactured by Unigue Enterprise Co., Ltd., Taiwan) is used as the second heat conducting filler. The proportion of the first and second heat conducting fillers to the corresponding thermally conductive silicone composition to be prepared, and the thermal conductivity of each of the thermally conductive silicone compositions to be prepared are shown in Table 4.

TABLE 4

| Examples | SiC (18 μm) | Al2O3 (1 μm) | Cross-Link | Thermal conductivity (W/m · K) |
|---|---|---|---|---|
| 19. | 50 vol % | 10 vol % | — | 2.1 |
| 20. | 40 vol % | 20 vol % | — | 2.3 |
| 21. | 30 vol % | 30 vol % | — | 2.1 |
| 22. | 20 vol % | 40 vol % | — | 2.2 |
| 23. | 10 vol % | 50 vol % | — | 2.0 |

As can be seen from the data shown in Table 4, the thermally conductive silicone composition prepared in Examples 19 to 23 have their thermal conductivity in a range from 2.0 W/Mk to 2.3 W/Mk.

EXAMPLES 24 TO 27

A liquid room temperature vulcanized silicone having a specific gravity of 0.98 and a consistency of 100 (trade name is SC412, made by Hsin Han Electronic Co. Ltd., Taiwan) is used as the silicone. In the Examples 24 to 27, a proportion of such silicone to the thermally conductice silicone composite to be prepared is 35% by volume. The first and second heat conducting fillers of Examples 24 to 27 are similar to those of Examples 1 to 8, except that the ratios thereof. The proportion of the first and second heat conducting fillers to the corresponding thermally conductive silicone composition to be prepared, and the thermal conductivity of each of the thermally conductive silicone compositions to be prepared are shown in Table 5.

TABLE 5

| Examples | SiC (18 μm) | ZnO (1~5 μm) | Cross-Link | Thermal conductivity (W/m · K) |
|---|---|---|---|---|
| 24 | 55 vol % | 10 vol % | — | — |
| 25 | 45 vol % | 20 vol % | — | 3.0 |
| 26 | 35 vol % | 30 vol % | — | 3.1 |
| 27 | 40 vol % | 25 vol % | — | 3.0 |
| 28 | 35 vol % | 30 vol % | ○ | 3.1 |

"○" denoting using hardener

As can be seen from data shown in Table 5, the thermally conductive silicone composition prepared in Examples 24 to 27 have their thermal conductivity in a range from 3.0 W/Mk to 3.4 W/Mk.

EXAMPLE 28

Referring to Table 5, a proportion of the silicone to the thermally conductive silicone composite to be prepared is 35% by volume. A proportion of the first heat conducting filler to the thermally conductive silicone composite to be prepared is 35% by volume, and a proportion of the second heat conducting filler to the thermally conductive silicone composite to be prepared is 30% by volume. Such silicone, first and second heat conducting fillers, and an appropriate hardener (trade name is SC412, made by Hsin Han Electronic Co. Ltd., Taiwan) are mixed and blended well to obtain a thermally conductive silicone composition. Then at room temperature, the thermally conductive silicone composition is cured and made into a heat dissipating sheet having a thickness of 3 millimeters. Finally, the thermal conductivity of the heat dissipating sheet is measured. Referring to Table 5, the thermal conductivity of the heat dissipating sheet is 3.1 W/mK.

COMPARATIVE EXAMPLES 1 TO 4

A liquid room-temperature vulcanized silicone having a specific gravity of 0.98 and a consistency of 100 (trade name is SC412, made by Hsin Han Electronic Co. Ltd., Taiwan) is used as the silicone. In the Comparative Examples 1 to 4, a proportion of such silicone to the thermally conductice silicone composite to be prepared is 40% by volume. Four sorts of first heat conducting filler with identical ratio (i.e., 60% by volume) are separately mixed in the silicone to form four sorts of mixtures. The thermal conductivity of such four sorts of mixtures is shown in Table 6.

TABLE 6

| Comparative Examples | SiC (18 μm) | ZnO (1-5 μm) | $Fe_2O_3$ (1 μm) | $Al_2O_3$ (1 μm) | Cross-Link | Thermal conductivity (W/m · K) |
|---|---|---|---|---|---|---|
| 1 | 60 vol % | — | — | — | — | X |
| 2 | — | 60 vol % | — | — | — | X |
| 3 | — | — | 60 vol % | — | — | X |
| 4 | — | — | — | 60 vol % | — | X |

As can be seen from data shown in Table 6, the mixtures prepared in Comparative Examples 1 to 4 are not thermally conductive silicone compositions.

COMPARATIVE EXAMPLES 5 TO 6

A liquid room-temperature vulcanized silicone having a specific gravity of 0.98 and a consistency of 100 (trade name is SC412, made by Hsin Han Electronic Co. Ltd., Taiwan) is used as the silicone. In the Comparative Examples 5 to 6, a proportion of such silicone to the thermally conductive silicone composite is 35%. The proportion of the first and second heat conducting fillers to the corresponding thermally conductive silicone composition to be prepared, and the thermal conductivity of each of the thermally conductive silicone compositions to be prepared are shown in Table 7. According to Table 7, the thermally conductive silicone composite prepared in Comparative examples 5 to 6 have their thermal conductivity in a range from 3.0 W/Mk to 3.4 W/Mk.

TABLE 7

| Comparative Examples | SiC (18 μm) | ZnO (1-5 μm) | SiC (50 μm) | Cross-Link | Thermal conductivity (W/m · K) |
|---|---|---|---|---|---|
| 5. | 40 vol % | 25 vol % | — | — | 3.0 |
| 6. | — | 25 vol % | 40 vol % | — | 3.4 |
| 7. | 40 vol % | 30 vol % | — | — | 3.9 |
| 8. | — | 30 vol % | 40 vol % | — | 4.4 |
| 9. | 20 vol % | 30 vol % | 20 vol % | — | 4.4 |
| 10. | 20 vol % | 21 vol % | 31 vol % | — | 4.4 |
| 11. | 21 vol % | 24 vol % | 28 vol % | — | 4.4 |
| 12. | 20 vol % | 23 vol % | 29 vol % | — | 4.8 |
| 13. | 20 vol % | 27 vol % | 25 vol % | — | 4.8 |
| 14. | 20 vol % | 25 vol % | 27 vol % | — | 4.9 |
| 15. | — | 20 vol % | 55 vol % | — | 5.8 |

COMPARATIVE EXAMPLES 7 TO 8

A liquid room-temperature vulcanized silicone having a specific gravity of 0.98 and a consistency of 100 (trade name is SC412, made by Hsin Han Electronic Co. Ltd., Taiwan) is used as the silicone. In the Comparative Examples 7 to 8, a proportion of such silicone to the thermally conductive silicone composite to be prepared is 30%. The proportion of the first and second heat conducting fillers to the corresponding thermally conductive silicone composition to be prepared, and the thermal conductivity of each of the thermally conductive silicone composites are shown in Table 7. As shown in Table 7, the thermally conductive silicone composite prepared in Comparative examples 7 to 8 have their thermal conductivity in a range from 3.9 W/Mk to 4.4 W/Mk.

COMPARATIVE EXAMPLES 9 TO 14

A liquid room-temperature vulcanized silicone having a specific gravity of 0.98 and a consistency of 100 (trade name is SC412, made by Hsin Han Electronic Co. Ltd., Taiwan) is used as the silicone. In the Comparative Examples 9 to 14, a proportion of such silicon compound to the thermally conductive silicone composite to be prepared is 30%. The proportion of the first and second heat conducting fillers to the corresponding thermally conductive silicone composition to be prepared, and the thermal conductivity of each of the thermally conductive silicone composition are shown in Table 7. As shown in Table 7, the thermally conductive silicone composites prepared in Comparative examples 9 to 14 have their thermal conductivity in a range from 4.4 W/Mk to 4.9 W/Mk.

COMPARATIVE EXAMPLE 15

A liquid room-temperature vulcanized silicone having a specific gravity of 0.98 and a consistency of 100 (trade name is SC412, made by Hsin Han Electronic Co. Ltd., Taiwan) is used as the silicone. In the Comparative Example 15, a proportion of such silicone to the thermally conductive silicone composite to be prepared is 25%. The proportion of the first and second heat conducting fillers to the corresponding thermally conductive silicone composition to be prepared, and the thermal conductivity of the thermally conductive silicone composition are shown in Table 7. As shown in Table 7, the thermal conductivity of the thermally conductive silicone composite prepared in Comparative example 15 is 5.8 W/Mk.

EXAMPLE 29

A high-temperature vulcanized silicone having a specific gravity of 1.08 (trade name is TSE221-3U, made by General Silicones Co. Ltd., Taiwan) is used as the silicone. In the Example 29, a proportion of such silicone to the thermally conductive silicone composite to be prepared is 35% by volume. Silicon carbide (SiC) particles having an average diameter of 18 millimeters (MODEL GC8000, manufactured by Titanex Corp., Taiwan) is used as the first heat conducting filler. A proportion of such Silicon carbide to the thermally conductive silicone composite is 45% by volume. Zinc oxide (ZnO) particles having an average diameter of 1 millimeter to 5 millimeters (manufactured by Pan-Continental Chemical Co., Ltd., Taiwan) is used as the second heat conducting filler. An appropriate hardener (an accessional hardener of TSE221-3U, made by General Silicones Co. Ltd., Taiwan) is provided. At room temperature, the mixture of the silicone, the first and second heat conducting fillers, and the hardener is blended well to form a thermally conductive silicone composition. The thermally conductive silicone composition is cured at 175 degrees Celsius for 15 minutes, and is made into a heat dissipating sheet having a thickness of 3 micrometers. The thermal conductivity of such heat dissipating sheet is measured. Referring to Table 8, the thermal conductivity of the heat dissipating sheet in Example 29 is 3.0 W/mK.

TABLE 8

| Examples | SiC (18 µm) | ZnO (1~5 µm) | Cross-Link | Thermal conductivity (W/m · K) |
|---|---|---|---|---|
| 29. | 45 vol % | 20 vol % | ○ | 3.0 |
| 30. | 45 vol % | 20 vol % | — | 2.5 |

EXAMPLE 30

The silicone, the first and second heat conducting fillers of Example 30 are similar to those of Example 29, except that their respective proportions. In addition, the thermally conductive silicone composition and its corresponding heat dissipating sheet are prepared in the same manner as in the aforementioned Example 29. Referring to Table 8, the thermal conductivity of the heat dissipating sheet in Example 30 is 2.5 W/mK.

COMPARATIVE EXAMPLES 30 TO 52

The silicone of Comparative Examples 30 to 52 is similar to that of Example 29. The proportion of the first and second heat conducting fillers to the corresponding thermally conductive silicone composition to be prepared, and the thermal conductivity of each of the thermally conductive silicone compositions are shown in Table 9. As shown in Table, the thermally conductice silicone composites prepared in Comparative Examples 30 to 52 have their thermal conductivity in a range from 0.39 W/Mk to 2.3 W/Mk.

TABLE 9

| Comparative Examples | Silicone Compound | SiC (18 µm) | AlN (2.5 µm) | $Al_2O_3$ (1 µm) | $Al_2O_3$ (50-100 µm) | Cross-Link | Thermal conductivity (W/m · K) |
|---|---|---|---|---|---|---|---|
| 30. | 90 vol % | 10 vol % | — | — | — | — | 0.39 |
| 31. | 80 vol % | 20 vol % | — | — | — | — | 0.56 |
| 32. | 70 vol % | 30 vol % | — | — | — | — | 0.77 |
| 33. | 60 vol % | 40 vol % | — | — | — | — | 1.2 |
| 34. | 50 vol % | 50 vol % | — | — | — | — | 1.7 |
| 35. | 40 vol % | 60 vol % | — | — | — | — | 2.1 |
| 36. | 90 vol % | — | 10 vol % | — | — | — | 0.49 |
| 37. | 80 vol % | — | 20 vol % | — | — | — | 0.74 |
| 38. | 70 vol % | — | 30 vol % | — | — | — | 0.92 |
| 39. | 60 vol % | — | 40 vol % | — | — | — | 1.1 |
| 40. | 50 vol % | — | 50 vol % | — | — | — | 1.8 |
| 41. | 44 vol % | — | 56 vol % | — | — | — | 2.3 |
| 42. | 90 vol % | — | — | 10 vol % | — | — | 0.51 |
| 43. | 80 vol % | — | — | 20 vol % | — | — | 0.65 |
| 44. | 70 vol % | — | — | 30 vol % | — | — | 0.78 |
| 45. | 60 vol % | — | — | 40 vol % | — | — | 1.1 |
| 46. | 50 vol % | — | — | 50 vol % | — | — | X |
| 47. | 90 vol % | — | — | — | 10 vol % | — | 0.40 |
| 48. | 80 vol % | — | — | — | 20 vol % | — | 0.48 |
| 49. | 70 vol % | — | — | — | 30 vol % | — | 0.64 |
| 50. | 65 vol % | — | — | — | 35 vol % | — | 0.87 |
| 51. | 60 vol % | — | — | — | 40 vol % | — | 0.98 |
| 52. | 55 vol % | — | — | — | 45 vol % | — | X |

COMPARATIVE EXAMPLES 53 TO 60

The proportion of the first, second, third heat conducting fillers to the corresponding thermally conductive silicone composition to be prepared, and the thermal conductivity of each of the thermally conductive silicone compositions are shown in Table 10. As shown in Table, the thermally conductice silicone composites prepared in Comparative Examples 53 to 56 have their thermal conductivity in a range from 3.2 W/Mk to 4.3 W/Mk.

TABLE 10

| Comparative Examples | Silicone Compound | SiC (18 µm) | ZnO (1~5 µm) | ZnO (100 nm) | Cross-Link | Thermal conductivity (W/m · K) |
|---|---|---|---|---|---|---|
| 53. | 35 vol % | 40 vol % | 24 vol % | 1 vol % | — | 3.3 |
| 54. | 35 vol % | 40 vol % | 23 vol % | 2 vol % | — | 3.2 |

TABLE 10-continued

| Comparative Examples | Silicone Compound | SiC (18 μm) | ZnO (1~5 μm) | ZnO (100 nm) | Cross-Link | Thermal conductivity (W/m · K) |
|---|---|---|---|---|---|---|
| 55. | 30 vol % | 40 vol % | 29 vol % | 1 vol % | — | 4.3 |
| 56. | 30 vol % | 40 vol % | 28 vol % | 2 vol % | — | 4.3 |

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A thermally conductive silicone composition, comprising 25 to 50 volume % of a silicone, 30 to 60 volume % of a first heat conducting filler, and 15 to 40 volume % of a second heat conducting filler, and 1 to 2 volume % of a third heat conducting filler.

2. The thermally conductive silicone composition as claimed in claim 1, wherein the silicone is a room temperature vulcanized silicone.

3. The thermally conductive silicone composition as claimed in claim 1, wherein a proportion of the sum of the first heat conducting filler and the second heat conducting filler to the thermally conductive silicone composition to be prepared is in a range from about 50% to 75% by volume.

4. The thermally conductive silicone composition as claimed in claim 1, wherein the first heat conducting filler is comprised of particles selected from a group consisting of copper oxide, magnesium oxide, iron oxide, titanium oxide, silicon carbide and iron carbide, and a particle diameter of the first heat conducting filler is in a range from about 15 micrometers to about 50 micrometers.

5. The thermally conductive silicone composition as claimed in claim 1, wherein the second heat conducting filler is comprised of particles selected from a group consisting of zinc oxide, magnesium oxide, titanium nitride, silicon carbide, iron carbide, iron oxide and copper oxide, and a particle diameter of the second heat conducting filler is in a range from about 1 micrometer to about 10 micrometers.

6. The thermally conductive silicone composition as claimed in claim 1, wherein the third heat conducting filler is comprised of particles selected from a group consisting of zinc oxide, and a particle diameter of the third heat conducting filler is in a range from about 100 nanometer to about 200 nanometers.

7. The thermally conductive silicone composition as claimed in claim 1, wherein a surface of the first heat conducting filler is modified by silicon tetrachloride.

8. The thermally conductive silicone composition as claimed in claim 1, wherein a surface of the second heat conducting filler is modified by silicon tetrachloride.

9. The thermally conductive silicone composition as claimed in claim 1, wherein a surface of the third heat conducting filler is modified by silicon tetrachloride.

10. A heat dissipating sheet comprising a thermally conductive silicone composition with a hardener dispersed therein is cured to form a heat dissipating sheet, and the thermally conductive silicone composition including 25 to 50 volume % of a silicone, 30 to 60 volume % of a first heat conducting filler, and 15 to 40 volume % of a second heat conducting filler, and 1 to 2 volume % of a third heat conducting filler.

11. The heat dissipating sheet as claimed in claim 10, wherein the thermally conductive silicone composition with the hardener dispersed therein is cured at room-temperature or at 175 degrees Celsius.

12. The thermally conductive silicone composition as claimed in claim 1, wherein a particle diameter of the first heat conducting filler is larger than that of the second heat conducting filler and a particle diameter of the second heat conducting filler is larger than that of the third heat conducting filler.

13. A thermally conductive silicone composition, comprising:
 a silicone;
 a first heat conducting filler; and
 a second heat conducting filler;
 a third heat conducting filler;
 wherein a proportion of the silicone to the thermally conductive silicone composition to be prepared is in a range from about 25% to 50% by volume, a proportion of the sum of the first heat conducting filler, the second heat conducting filler and the third heat conducting filler to the thermally conductive silicone composition to be prepared is in a range from about 50% to 75% by volume, a proportion of the first heat conducting filler to the thermally conductive silicone composition to be prepared is in a range from about 30% to 60% by volume.

14. The thermally conductive silicone composition as claimed in claim 12, wherein a proportion of the second heat conducting filler to the thermally conductive silicone composition to be prepared is in a range from about 20% to 40% by volume.

15. The thermally conductive silicone composition as claimed in claim 12, wherein a proportion of the third heat conducting filler to the thermally conductive silicone composition to be prepared is in a range from about 1% to 2% by volume.

* * * * *